United States Patent
De Graauw

(10) Patent No.: US 7,233,775 B2
(45) Date of Patent: Jun. 19, 2007

(54) TRANSMIT AND RECEIVE ANTENNA SWITCH

(75) Inventor: Antonius Johannes Matheus De Graauw, Nijmegen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 10/531,033

(22) PCT Filed: Sep. 19, 2003

(86) PCT No.: PCT/IB03/04262

§ 371 (c)(1),
(2), (4) Date: Apr. 12, 2005

(87) PCT Pub. No.: WO2004/036778

PCT Pub. Date: Apr. 29, 2004

(65) Prior Publication Data

US 2006/0141943 A1 Jun. 29, 2006

(30) Foreign Application Priority Data

Oct. 14, 2002 (EP) .................................. 02079324

(51) Int. Cl.
*H04B 1/44* (2006.01)
*H04B 1/46* (2006.01)
*H04B 15/00* (2006.01)
*H04M 1/00* (2006.01)

(52) U.S. Cl. .................... 455/78; 455/63.3; 455/82; 455/83; 455/550.1; 455/575.7; 455/552.1; 455/556.2

(58) Field of Classification Search .. 455/193.1–193.3, 455/269, 550.1, 180.1–180.4, 188.1, 188.2, 455/199.1, 169.2, 168.1, 13.3, 19, 63.3–63.4, 455/77–78, 80, 82–83, 562.1, 575.5, 575.7, 455/121, 129, 95, 3.05, 127.3, 127.4, 123, 455/403, 191.2, 1, 500.1, 552.1, 553.1, 556.2; 340/14.66, 14.68; 257/130, 155, 161; 326/133; 342/435, 444; 334/87; 335/4, 6, 11, 106–107, 335/160, 206; 343/700 R, 722, 745, 907; 370/339

See application file for complete search history.

(56) References Cited

U.S. PATENT DOCUMENTS 6,014,551 A * 1/2000 Pesola et al. ................ 455/86
6,021,318 A * 2/2000 Schaffer ...................... 455/78

(Continued)

FOREIGN PATENT DOCUMENTS

EP 1 152 543 A1 11/2001

(Continued)

*Primary Examiner*—Meless Zewdu

(57) ABSTRACT

Antenna switches (1,10) in dual-band or multi-band mobile phones are according to a basic idea provided with a serial semiconductor switches (11,21,12,22) per transmitting branch (2,3) and with a further semiconductor switch (13, 23) coupled in parallel to a receiving branch (4,5,6), to obtain isolation between branches (2-6) in a simple way. Said semiconductor switches are PIN diodes or MEMS switches or pHEMT switches. Another semiconductor switch (14) coupled in parallel to the receiving branches (4-6) allows together with said further semiconductor (13) the introduction of elements (15,16) without a transmission line. Alternatively, the antenna switch (1,10) may comprise a transmission line (24,25), in which case the receiving branches (4,5,6) can be switched via transistor switches (26,27,28). This all improves isolation, reduces costs, complexity, size and high Radio-Frequency (RF) losses.

9 Claims, 2 Drawing Sheets

U.S. PATENT DOCUMENTS

Figure 1:
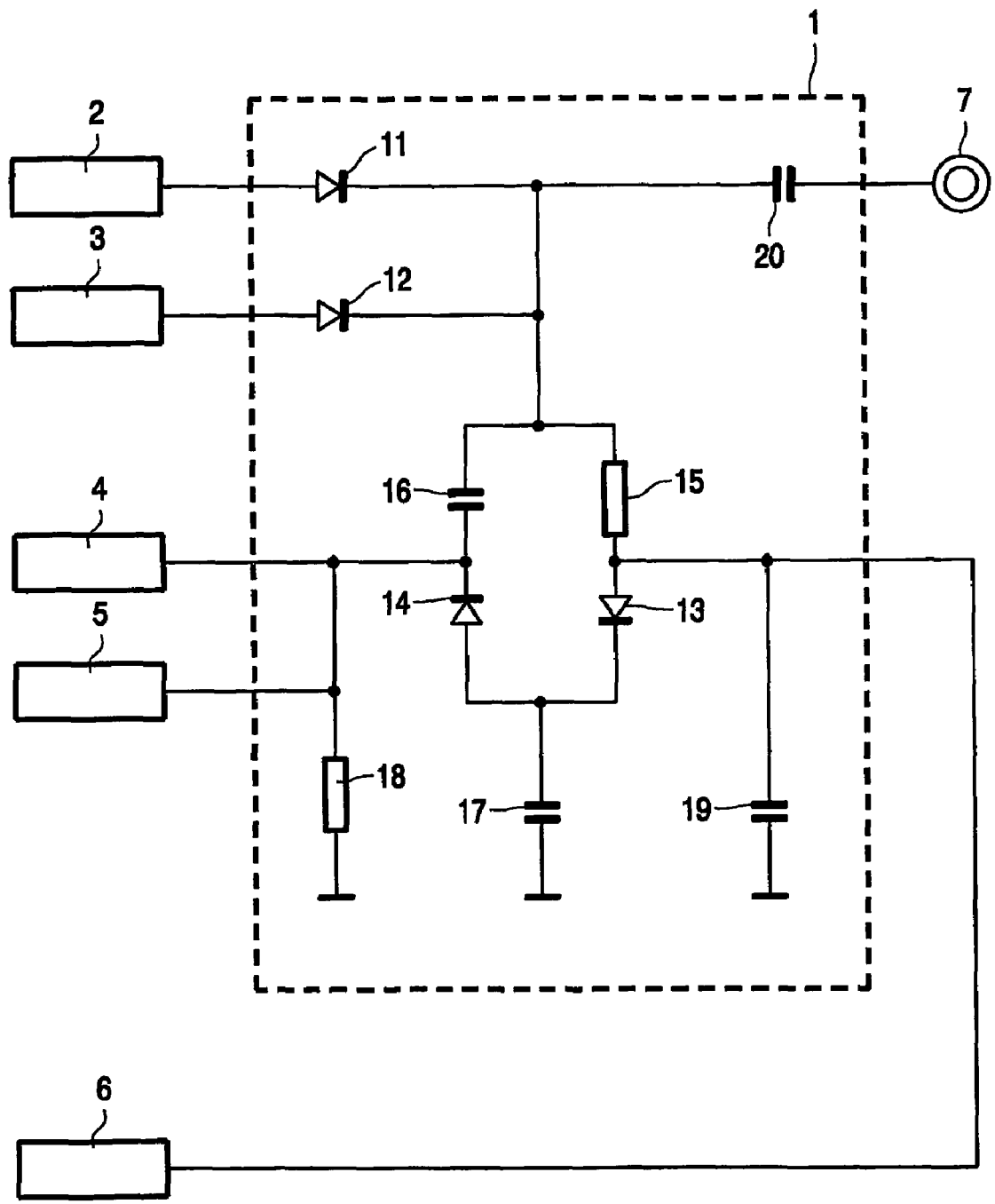

| | | | |
|---|---|---|---|
| 6,560,444 B1 * | 5/2003 | Imberg | 455/78 |
| 6,633,748 B1 * | 10/2003 | Watanabe et al. | 455/78 |
| 6,639,489 B2 * | 10/2003 | Okuda et al. | 333/104 |
| 6,862,436 B2 * | 3/2005 | Hayakawa et al. | 455/121 |
| 7,003,312 B2 * | 2/2006 | Kemmochi et al. | 455/552.1 |
| 7,005,940 B2 * | 2/2006 | Kodim | 333/101 |
| 2002/0086644 A1 * | 7/2002 | Koskinen | 455/88 |

FOREIGN PATENT DOCUMENTS

| | | | |
|---|---|---|---|
| WO | WO 00/38341 | * | 6/2000 |

* cited by examiner

TRANSMIT AND RECEIVE ANTENNA SWITCH

The invention relates to a device such as a mobile terminal, a dual-band or multi-band mobile phone or the like, or any other transmit and receive device, or to a module for such a device. Such a device comprises an antenna switch for switching one or more transmitting branches each for transmitting signals via at least one frequency band, which antenna switch is located between an antenna and said transmitting and receiving branches, each for receiving signals via at least one frequency band.

The invention also relates to an antenna switch for switching transmitting branches each for transmitting signals via an antenna and at least one frequency band, with at least two receiving branches each receiving signals via at least one frequency band and said antenna, and to a method for switching transmitting branches each for transmitting signals via an antenna and at least one frequency band, with at least two receiving branches each receiving signals via at least one frequency band and said antenna.

Such dual-band or multi-band mobile phones are for example used in Time Division Multiple Access (TDMA) systems.

A prior art system is known from EP 1 152 543 A1, which discloses a hybrid radio frequency switching device. According to this device (FIGS. 8,9 of EP 1 152 543 A1), the antenna switch comprises one diode for switching both transmitting branches. The first transmitting branch (Tx GSM) is coupled via a first low pass filter to a low pass+high pass filter, and the second transmitting branch (Tx DCS/PCS) is coupled via a second low pass filter to said low pass+high pass filter. This low pass+high pass filter is further coupled to said diode.

The known system is disadvantageous, inter alia, owing to the fact that the branches are isolated from each other in a complex way, as a consequence of which the known system will have high Radio Frequency (RF) losses.

It is an object of the invention, inter alia, to provide a low-cost device or module for such a device in which at least two branches are isolated from each other in a simple manner.

It is a further object of the invention, inter alia, to provide a low-cost antenna switch for isolating at least two branches from each other in a simple way.

It is yet a further object of the invention, inter alia, to provide a method whereby at least two branches are isolated from each other in a simple way.

The device or module according to the invention comprises:
  at least two transmitting branches each for transmitting signals via at least one frequency band,
  at least two receiving branches each for receiving signals via at least one frequency band,
  an antenna switch for switching said transmitting branches, and
  an antenna coupled to said branches via said antenna switch, wherein said antenna switch comprises at least one first semiconductor switch in series coupled between a first transmitting branch and said antenna and at least one second semiconductor switch in series coupled between a second transmitting branch and said antenna and at least one third semiconductor switch coupled in parallel to at least one receiving branch.

By providing the antenna switch with said semiconductor switches such as PIN diodes or MEMS switches or pHEMT switches, said transmitting branches and said receiving branch are well isolated from each other in a simple way. During transmission via the first transmitting branch, the first and third semiconductor switches are conducting, while the second semiconductor switch is not conducting. As a result, the high power transmission signals from the first transmitting branch cannot enter the second transmitting branch (non-conducting second semiconductor switch) and cannot enter said receiving branch (short-circuited by the conducting third semiconductor switch). During transmission via the second transmitting branch, the second and third semiconductor switches are conducting, while the first semiconductor switch is not conducting. As a result, the high power transmission signals from the second transmitting branch cannot enter the first transmitting branch (non-conducting first semiconductor switch) and cannot enter said receiving branch (short-circuited by the conducting third semiconductor switch). During reception, all semiconductor switches are non-conducting. As a result, low power receive signals cannot enter both transmitting branches (non-conducting first and second semiconductor switches) and can enter said receiving branch (which is now not short-circuited by the now non-conducting third semiconductor switch).

In an embodiment of the device according to the invention, said antenna switch is provided with the fourth semiconductor switch like for example a PIN diode or a MEMS switch or a pHEMT switch. Herewith, said transmitting branches and said further receiving branch are still isolated from each other in a simple way. During transmission, the fourth semiconductor switch is conducting, as a result, the high power transmission signals from the first or second transmitting branch cannot enter said further receiving branch (short-circuited by the conducting fourth semiconductor switch). During reception, this fourth semiconductor switch is non-conducting, as a result, low power receive signals can enter said further receiving branch (which is now not short-circuited by the now non-conducting third semiconductor switch). The combination of said third and fourth semiconductors allows the advantageous introduction of further elements as described below.

In an embodiment of the device according to the invention, one side of said third semiconductor switch is coupled to said at least one receiving branch and via an inductor to said first and second semiconductor switches and the other side is coupled via a capacitor to ground, with one side of said fourth semiconductor switch being coupled via said capacitor to ground and the other side being coupled to said at least one further receiving branch and via a further capacitor to said first and second semiconductor switches. By providing the antenna switch with a capacitor, said third and fourth semiconductor switches are coupled to ground for Radio-Frequency (RF) signals. Said inductor and said further capacitor provide a high impedance for high power signals originating from the transmitting branches and which are to be transmitted, and provide separation of high and low bands.

In an embodiment of the device according to the invention, the antenna switch is made transmission-line-less, which is possible after having introduced said semiconductor switches, said inductor and said further capacitor, fewer components are used, which reduces the costs and the size and the high Radio-Frequency (RF) losses of the system. In fact, said inductor and said further capacitor together replace one or more prior art transmission lines.

In an embodiment of the device according to the invention, said first transmitting branch transmits in the 900 MHz band, said second transmitting branch transmits in the 1800/1900 MHz band, said at least one receiving branch receives in the 900 MHz band, and said at least one further receiving branch comprises a first further receiving branch for receiving in the 1800 MHz band and a second further receiving branch for receiving in the 1900 MHz band.

Especially for the 900 MHz band, the 1800 MHz band and the 1900 MHz band, but not exclusively, it is important to come up with a device and an antenna switch having a simple topology.

In an embodiment of the device, said antenna switch comprises at least one transmission line of which one side is coupled to one side of said first semiconductor switch and to said antenna, with the other side of said transmission line being coupled to said third semiconductor switch, and with a tap of said transmission line being coupled to one side of said second semiconductor switch.

By providing the antenna switch with the transmission line, said first, second and third semiconductor switch are coupled compactly, and the receiving branches can be controlled (switched) according to a variety of possibilities. Instead of using one transmission line with a tap, of course two serial transmission lines can be used as well.

In an embodiment of the device according to the invention, said antenna switch further comprises a transistor switch per receiving branch and coupled in series between said receiving branch and said transmission line.

By providing the antenna switch with a transistor switch per receiving branch, as a result of said third semiconductor switch, together with said transmission line during transmission protecting (short-circuiting) the receiving branches against high power signals originating from the transmitting branches and to be transmitted, these transistor switches can be of small size, and the size of system is further reduced. As a yet further result of this, the transistor switches, like for example GaAs pHEMT switches, can be replaced by MESFET or RF CMOS switches, which offers reduced dependencies from GaAs suppliers and, as a consequence, reduced costs. Compared to prior-art solutions with one transistor switch per (transmitting and receiving) branch (and/or a number of serial transistor switches per transmitting branch due to high power transmission signals needing to be switched), the sixth embodiment has reduced high Radio-Frequency (RF) losses (due to fewer transistors being connected in parallel and/or series), and the large transistor switches for the transmitting branches are avoided (replaced by said transmission line), resulting in a reduced size (these transistor switches had to be large to be able to switch the high power transmission signals).

Embodiments of the antenna switch according to the invention and of the method according to the invention correspond with the embodiments of the device or the module for the device according to the invention.

It should be observed that, due to only conducting during a transmission mode, with said transmission mode generally being active during shorter time-intervals than a receiving mode, and with said transmission mode requiring so much transmission power that during the transmission mode any biasing power is irrelevant, said semiconductor switches may be any kind of semiconductor switches, such as all kinds of diodes, transistors etc.

The invention is based upon an insight, inter alia, that prior art branches are isolated in an expensive and complex way, and is based upon a basic idea, inter alia, that a serial semiconductor switch per transmitting branch and a parallel semiconductor switch for one or more receiving branches for short-circuiting these one or more receiving branches during transmission offer good isolation in a low-cost and simple way.

The invention solves the problem, inter alia, of providing a low cost system in which at least two branches are isolated from each other in a simple way, and is advantageous, inter alia, in that the size of the system is reduced, with many further advantages and/or improvements as defined by the first to the seventh embodiment now being possible.

It should further be observed that, for example in dual-band or multi-band mobile phones in TDMA systems, it is important to isolate transmitting branches from each other, to isolate receiving branches from each other, and to isolate transmitting branches from receiving branches and vice versa.

These and other aspects of the invention will be apparent from and elucidated with reference to the embodiments(s) described hereinafter.

Figure 2:
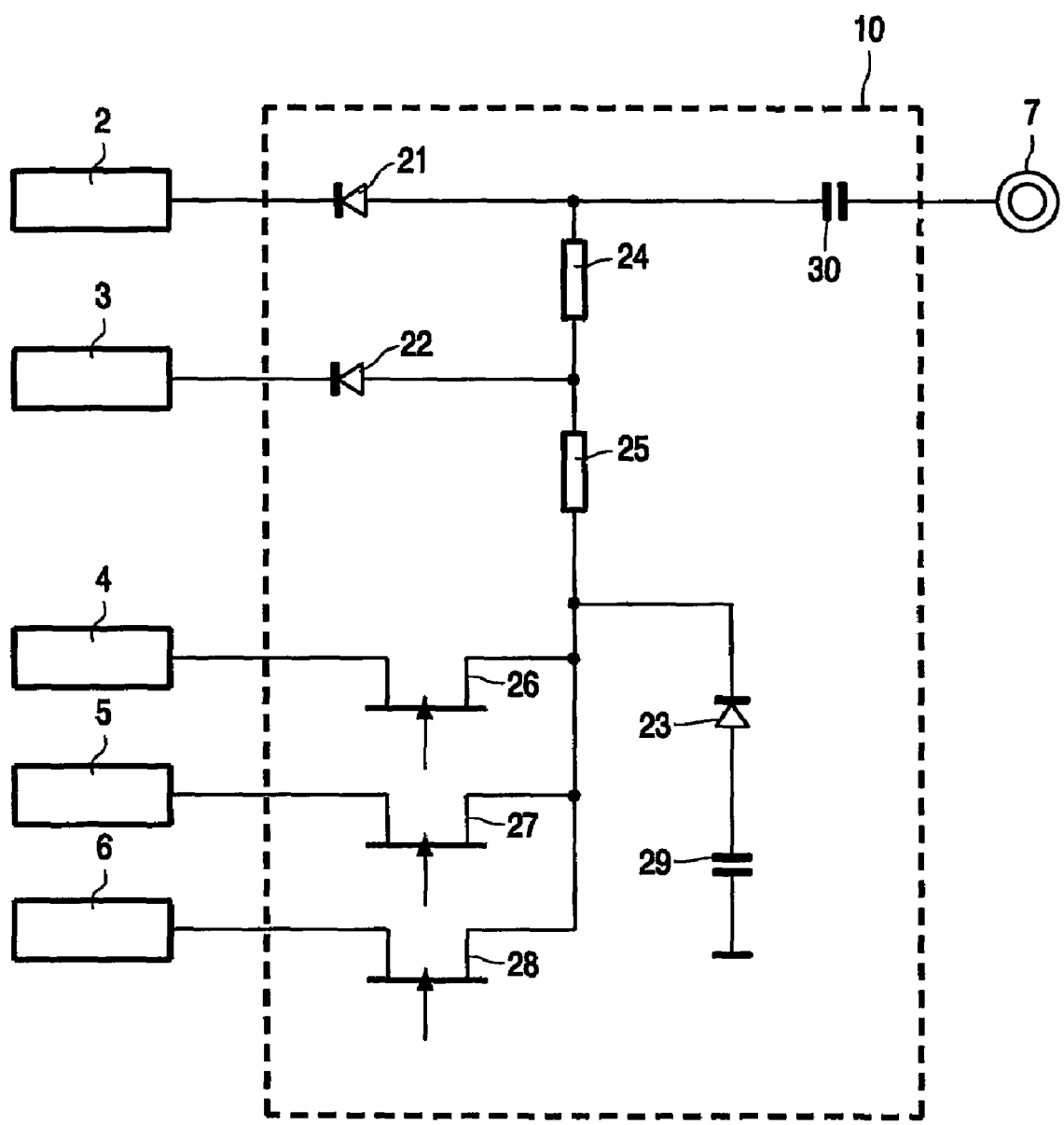

FIG. 1 is a block diagram of a device with an antenna switch according to the invention with four semiconductor switches, and FIG. 2 is a block diagram of a device with an antenna switch according to the invention with three semiconductor switches, a transmission line and three transistor switches.

The device according to the invention shown in FIG. 1 is, for instance, a mobile terminal such as a dual-band or multi-band mobile phone. The device comprises antenna switch 1 according to the invention, transmitting branches 2 and 3, receiving branches 4, 5 and 6, and an antenna 7. The device shown may be a complete ready-to-use apparatus but may also be a module for such a complete ready-to-use apparatus, such as an RF front-end module. Antenna switch 1 comprises a first semiconductor switch 11 of which an anode is coupled to first transmitting branch 2 and of which a cathode is coupled via a capacitor 20 to antenna 7 and comprises a second semiconductor switch 12 of which an anode is coupled to second transmitting branch 3 and of which a cathode is coupled via capacitor 20 to antenna 7. Said cathodes are further coupled to a bridge circuit comprising two serial circuits coupled in parallel: the first serial circuit comprises an inductor 15 and a third semiconductor switch 13, of which inductor 15 is coupled to said cathodes and of which third semiconductor switch 13 is further coupled via a capacitor 17 to ground; the second serial circuit comprises a capacitor 16 and a fourth semiconductor switch 14, of which capacitor 16 is coupled to said cathodes and of which fourth semiconductor switch 14 is further coupled via capacitor 17 to ground. A node between inductor 15 and third semiconductor switch 13 is coupled to first receiving branch 6 and via a capacitor 19 to ground. A node point between capacitor 16 and fourth semiconductor switch 14 is coupled to second receiving branch 5 and to third receiving branch 4 and via an inductor 18 to ground.

In the device according to the invention, the first semiconductor switch 11 is coupled in series between first transmitting branch 2 and antenna 7 (note that the term "coupled to" does not exclude other elements being present in between, such as capacitor 20). The second semiconductor switch 12 is coupled in series between second transmitting branch 3 and antenna 7 (for the term "coupled to" see above). The third semiconductor switch 13 is coupled in parallel to at least one receiving branch 6 (note that the term "coupled in parallel" is used for expressing that third semiconductor switch 13 is not coupled in series between at least one receiving branch 6 and antenna 7; in view of the coupling between receiving branch 6 and antenna 7, said third semiconductor switch 13 is coupled in parallel to this coupling). The fourth semiconductor switch 14 is coupled in parallel to at least one further receiving branch 4,5 and coupled in parallel to said third semiconductor switch 13 (for the term "coupled in parallel" see above).

By providing the antenna switch 1 with said semiconductor switches 11, 12, 13 and 14 like for example PIN diodes or MEMS switches or pHEMT switches, said transmitting branches and said receiving branch are well isolated from each other in a simple way: During transmission via the first transmitting branch 2, the first, third and fourth semiconductor switches 11, 13 and 14 are conducting, with the second semiconductor switch 12 being non-conducting. As a result, the high power transmission signals from the first transmitting branch 2 cannot enter the second transmitting branch 3 (non-conducting second semiconductor switch 12) and cannot enter said receiving branches 4, 5 and 6 (short-circuited by the conducting third and/or fourth semiconductor switches 13 and/or 14). During transmission via the second transmitting branch 3, the second, third and fourth semiconductor switches 12, 13 and 14 are conducting, with the first semiconductor switch 11 being non-conducting. As a result, the high power transmission signals from the second transmitting branch 3 cannot enter the first transmitting branch 2 (non-conducting first semiconductor switch 11) and cannot enter said receiving branches 4, 5 and 6 (short-circuited by the conducting third and/or fourth semiconductor switches 13 and/or 14). During reception, all semiconductor switches 11-14 are non-conducting. As a result, low power receive signals cannot enter the two transmitting branches 2 and 3 (non-conducting first and second semiconductor switches 11 and 12) and can enter said receiving branches (which now are not short-circuited by the now non-conducting third and fourth semiconductor switches 13 and 14), with filters (see below) in said receiving branches taking care of properly filtering these low-power receive signals.

Capacitor 17 causes third and fourth semiconductor switches 13 and 14 to be coupled to ground for Radio Frequency (RF) signals. Inductor 15 and capacitor 16 provide a high impedance for high-power signals originating from the transmitting branches 2 and 3 and to be transmitted, and provide separation of high and low bands.

After having introduced said semiconductor switches 11, 12, 13 and 14, together with inductor 15 and capacitor 16, antenna switch 1 can be made without a transmission line and fewer components are used, which reduces the costs and size and the high Radio-Frequency (RF) losses of the system. In fact, inductor 15 and capacitor 16 together replace one or more prior-art transmission lines.

First transmission branch 2 and first receiving branch 6 for example use the 900 MHz band, second transmission branch 3 and second receiving branch 5 for example use the 1800 MHz band, and second transmission branch 3 and third receiving branch 4 for example use the 1900 MHz band. Especially for these bands, but not exclusively, it is important to come up with a system and an antenna switch having a simple topology. So other bands are not to be excluded, and further branches are not to be excluded, like for example a third transmitting branch and a fourth receiving branch for a fourth band, and/or the splitting of said second transmitting branch 3 into two subbranches 3a and 3b not shown, each for its own band etc.

First and second transmitting branches 2 and 3 for example comprise (each or together) a power amplifier coupled to antenna switch 1 via a filter per transmitting branch 2,3. This filter for example comprises a parallel circuit of a first inductor and a first capacitor, with each side of said parallel circuit being coupled to ground via a second/third capacitor and a first/second transmission line, and with one side of said parallel circuit being a filter-input coupled to the power amplifier and with another side of said parallel circuit being coupled to one side of a fourth capacitor of which another side forms a filter output coupled to the corresponding semiconductor switch and which other side is further coupled via a second inductor to a bias input/output, which bias input/output is further coupled to ground via a fifth capacitor. At least said second inductor and/or at least one capacitor of said filter are used for tuning a resonant frequency of the circuit comprising inductor 15 and capacitor 16.

First, second and third receiving branches 4, 5 and 6 for example comprise (each or together) a low-noise amplifier coupled to antenna switch 1 via a filter for each receiving branch 4,5,6. This filter for example comprises a Surface Accoustic Wave (SAW) filter or Bulk Acoustic Wave (BAW) filter of which inputs are coupled to filter-inputs which are further coupled to each other via an inductor and of which an output is coupled to one side of a capacitor of which another side forms a filter output coupled to the bridge. For first and second receiving branches 4 and 5, both filters and both capacitors together with inductor 18 form a band separating network. Inductor 15 and capacitor 16 separate three (receiving) bands into two (receiving) bands plus one (receiving) band, which two (receiving) bands are separated from each other by means of for example said SAW filter(s) or BAW filter(s). As a result, semiconductor switches 11, 12, 13 and 14 can be cheap PIN diodes instead of using more expensive pHEMT technology.

The biasing of the semiconductor switches 11-14 can be realized via a DC-current flowing from said bias input/output via said second inductor and said first/second semiconductor switch 11/12, and inductor 15, third semiconductor switch 13 and fourth semiconductor switch 14 and inductor 18 to ground. It should be noted that the polarity of said semiconductors does not have any influence on the Radio Frequency (RF) signals, it is just of importance to the biasing situation. Preferably, the polarities are chosen such that biasing currents are used at maximum efficiency: as shown in FIG. 1, one biasing current can be used for first/second semiconductor switch 11/12 and third semiconductor switch 13 and fourth semiconductor switch 14.

The device according to the invention shown in FIG. 2 comprises antenna switch 10, and, as in FIG. 1, transmitting branches 2 and 3, receiving branches 4, 5 and 6, and an antenna 7. Antenna switch 10 comprises a first semiconductor switch 21 of which a cathode is coupled to first transmitting branch 2 and of which an anode is coupled via a capacitor 30 to antenna 7, and comprises a second semiconductor switch 22 of which a cathode is coupled to second transmitting branch 3 and of which an anode is coupled to a tap of a transmission line 24,25. One end of this transmission line 24,25 is coupled to the anode of first semiconductor switch 21, and another end of this transmission line 24,25 is coupled to a cathode of a third semiconductor switch 23. An anode of third semiconductor switch 23 is coupled via a capacitor 29 to ground. Said cathode of third semiconductor switch 23 is further coupled to first main electrodes of three transistor switches 26, 27 and 28, of which second main electrodes are coupled to third, second and first receiving branches 4, 5 and 6.

In the device according to the invention, the first semiconductor switch 21 is coupled in series between first transmitting branch 2 and antenna 7 (note that the term "coupled to" does not exclude other elements being present in between, such as capacitor 30). The second semiconductor switch 22 is coupled in series between second transmitting branch 3 and antenna 7 (for the term "coupled to" see above). The third semiconductor switch 23 is coupled in parallel to at least one receiving branch 4,5,6 (note that the term "coupled in parallel" is used to express that third semiconductor switch 23 is not coupled in series between at least one receiving branch 4,5,6 and antenna 7; in view of the coupling between receiving branch 4,5,6 and antenna 7, said third semiconductor switch 23 is coupled in parallel to this coupling).

By providing the antenna switch 10 with said semiconductor switches 21, 22 and 23 like for example PIN diodes or MEMS switches or pHEMT switches, said transmitting branches and said receiving branches are isolated from each other in a simple way: During transmission via the first transmitting branch 2, the first and third semiconductor switches 21 and 23 are conducting, with the second semiconductor switch 22 being non-conducting. As a result, the high power transmission signals from the first transmitting branch 2 cannot enter the second transmitting branch 3 (non-conducting second semiconductor switch 22) and cannot enter said receiving branches 4, 5 and 6 (short-circuited by the conducting third semiconductor switch 23). During transmission via the second transmitting branch 3, the second and third semiconductor switches 22 and 23 are conducting, with the first semiconductor switch 21 being non-conducting. As a result, the high power transmission signals from the second transmitting branch 3 cannot enter the first transmitting branch 2 (non-conducting first semiconductor switch 21) and cannot enter said receiving branches 4, 5 and 6 (short-circuited by the conducting third semiconductor switch 23). During reception all semiconductor switches 21-23 are non-conducting. As a result, low power receive signals cannot enter the two transmitting branches 2 and 3 (non-conducting first and second semiconductor switches 21 and 22) and can enter said receiving branches (which are not short-circuited now by the third semiconductor switch 23 which is non-conducting now).

By providing the antenna switch with the transmission line 24,25, said first, second and third semiconductor switches 21, 22 and 23 are coupled, and the receiving branches 4,5,6 can be controlled (switched) according to a variety of possibilities, as described below. Instead of using one transmission line 24,25 with a tap, of course two serial transmission lines 24 and 25 can be used as well. And each transmission line 24,25 can be replaced by the known equivalent in the form of a T-network or a Π-network having one or two capacitor(s) connected to ground and two or one inductor(s) connected in series, respectively.

The transistor switches 26, 27 and 28 switch the receiving branches 4, 5 and 6, by controlling their control electrodes. They can be of small size, which further reduces the size of system, as a result of said third semiconductor switch 23 together with said transmission line 24,25 during transmission protecting (short-circuiting) the receiving branches 4, 5 and 6 and the transistor switches 26, 27 and 28 against high power signals originating from the transmitting branches 2 and 3. As a yet further result of this, the transistor switches, such as for example GaAs pHEMT switches, can be replaced by MESFET or RF CMOS switches, which offers reduced dependencies from GaAs suppliers and, as a consequence, reduced costs. Compared to prior art solutions with one transistor switch per (transmitting and receiving) branch (and/or a number of serial transistor switches per transmitting branch due to high power transmission signals needing to be switched), this embodiment has reduced Radio Frequency (RF) losses (due to fewer transistors being connected in parallel and/or in series), and the large transistor switches for the transmitting branches are avoided (replaced by said transmission line), resulting in a reduced size (these transistor switches had to be large to be able to switch the high power transmission signals). Transmission line 24,25 and third semiconductor switch 23 provide a high impedance for high power signals originating from the transmitting branches 2 and 3 and to be transmitted.

First transmission branch 2 and first receiving branch 6 for example use the 900 MHz band, second transmission branch 3 and second receiving branch 5 for example use the 1800 MHz band, and second transmission branch 3 and third receiving branch 4 for example use the 1900 MHz band. Especially for these bands, but not exclusively, it is important to come up with a system and an antenna switch having a simple topology. So other bands are not to be excluded, and further branches are not to be excluded, like for example a third transmitting branch and a fourth receiving branch for a fourth band, and/or the splitting of said second transmitting branch 3 into two subbranches 3a and 3b not shown, each for its own band etc.

First and second transmitting branches 2 and 3 for example comprise (individually or together) a power amplifier coupled to antenna switch 1 via a filter per transmitting branch 2,3. This filter for example comprises a parallel circuit of a first inductor and a first capacitor, with each side of said parallel circuit being coupled to ground via a second/third capacitor and a first/second transmission line, and with one side of said parallel circuit being a filter output coupled to the corresponding semiconductor switch and with another side of said parallel circuit being coupled via a fourth capacitor to a filter input and via a second inductor to a bias input/output, which bias input/output is further coupled to ground via a fifth capacitor.

First, second and third receiving branches 4, 5 and 6 for example comprise (individually or together) a low noise amplifier coupled to antenna switch 1 via a filter per receiving branch 4,5,6. This filter for example comprises a Surface Accoustic Wave or SAW filter of which inputs are coupled to filter inputs which are further coupled to each other via an inductor and of which an output is coupled to one side of a capacitor of which another side forms a filter output coupled to the corresponding transistor switch.

The biasing of the semiconductor switches 21-23 can be realized via a DC-current flowing from the anode of the third semiconductor switch 23 via transmission line 24,25 and said first/second semiconductor switch 21/22 and said first inductors in the filters in the transmitting branches and the second inductors to the bias input/output. It should be noted that the polarity of said semiconductors does not have any influence on the Radio Frequency (RF) signals, it is just of importance to the biasing situation. Preferably, the polarities are chosen such that biasing currents are used at maximum efficiency: as shown in FIG. 2, one biasing current can be used for first/second semiconductor switch 21/22 and third semiconductor switch 23.

The transmission line 24,25 will have an electrical length of about 90 degrees at 900 MHz, but can for example also be made smaller than 90 degrees. Said (for example second) capacitors in said filters (for example at the filter outputs) in the transmitting branches are used to tune this transmission line 24,25. In case of the entire transmission line corresponding with $\lambda/4$, each part (24 and 25) of this transmission line will correspond with $\lambda/8$. As said before, one transmission line 24,25 corresponding with λ/4 can be replaced by two serial transmission lines 24 and 25 each corresponding with λ/8.

The expression "for" in for example "for transmitting" and "for receiving" and "for switching" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised/included as well. The terms "a" and "an" do not exclude the possible presence of one or more pluralities.

The invention is based upon an insight, inter alia, that prior art branches are isolated in an expensive and complex way, and is based upon a basic idea, inter alia, that a serial semiconductor switch per transmitting branch and a parallel semiconductor switch for one or more receiving branches for short-circuiting these one or more receiving branches during transmission offer good isolation in a low-cost and simple way.

The invention solves the problem, inter alia, of providing a low-cost device or module for a device in which at least two branches are isolated from each other in a simple way and is advantageous, inter alia, in that the size of the device is reduced, with many further advantages and/or improvements now being possible.

The invention claimed is:

1. Device comprising:
   at least two transmitting branches each for transmitting signals via at least one frequency band;
   at least two receiving branches each for receiving signals via at least one frequency band;
   an antenna switch for switching said transmitting branches; and
   an antenna coupled to said branches via said antenna switch;
   wherein said antenna switch comprises:
   at least one first semiconductor switch in series coupled between a first transmitting branch and said antenna;
   at least one second semiconductor switch in series coupled between a second transmitting branch and said antenna; and
   at least one third semiconductor switch coupled in parallel to at least one receiving branch;
   wherein said antenna switch is transmission-line-less.

2. Device according to claim 1, wherein said antenna switch comprises at least a fourth semiconductor switch coupled in parallel to at least one further receiving branch.

3. Device according to claim 2, wherein one side of said third semiconductor switch is coupled to said at least one receiving branch and via an inductor to said first and second semiconductor switches and the other side is coupled via a capacitor to ground, with one side of said fourth semiconductor switch being coupled via said capacitor to ground and the other side being coupled to said at least one further receiving branch and via a further capacitor to said first and second semiconductor switches.

4. Device according to claim 3, wherein said first transmitting branch transmits in the 900 MHz band, said second transmitting branch transmits in the 1800/1900 MHz band, said at least one receiving branch receives via the 900 MHz band, and said at least one further receiving branch comprises a first further receiving branch for receiving via the 1800 MHz band and a second further receiving branch for receiving via the 1900 MHz band.

5. Device comprising:
   at least two transmitting branches each for transmitting signals via at least one frequency band;
   at least two receiving branches each for receiving signals via at least one frequency band;
   an antenna switch for switching said transmitting branches; and
   an antenna coupled to said branches via said antenna switch;
   wherein said antenna switch comprises:
   at least one first semiconductor switch in series coupled between a first transmitting branch and said antenna;
   at least one second semiconductor switch in series coupled between a second transmitting branch and said antenna;
   at least one third semiconductor switch coupled in parallel to at least one receiving branch;
   at least one transmission line of which one side is coupled to one side of said first semiconductor switch and to said antenna, with the other side of said transmission line being coupled to said third semiconductor switch, and a tap of said transmission line being coupled to one side of said second semiconductor switch; and a transistor switch per receiving branch coupled in series between said receiving branch and said transmission line.

6. Device according to claim 5, wherein said first transmitting branch transmits in the 900 MHz band, said second transmitting branch transmits in the 1800/1900 MHz band, and said at least one receiving branch comprises a first receiving branch for receiving via the 900 MHz band and a second receiving branch for receiving via the 1800 MHz band and a third receiving branch for receiving via the 1900 MHz band.

7. Module for a device, said module comprising:
   at least two transmitting branches each for transmitting signals via at least one frequency bands;
   at least two receiving branches each for receiving signals via at least one frequency band; an antenna switch for switching said transmitting branches; and
   an antenna coupled to said branches via said antenna switch,
   wherein said antenna switch comprises:
   at least one first semiconductor switch in series coupled between a first transmitting branch and said antenna;
   at least one second semiconductor switch in series coupled between a second transmitting branch and said antenna; and
   at least one third semiconductor switch coupled in parallel to at least one receiving branch;
   wherein said antenna switch is transmission-line-less.

8. Antenna switch for switching transmitting branches each for transmitting signals via an antenna and at least one frequency band, with at least two receiving branches each receiving signals via a least one frequency band and said antenna, wherein said antenna switch comprises:
   at least one first semiconductor switch to be coupled in series between a first transmitting branch and said antenna;
   at least one second semiconductor switch to be coupled in series between a second transmitting branch and said antenna; and at least, one third semiconductor switch to be coupled in parallel to at least one receiving branch;

wherein said antenna switch is transmission-line-less.

9. Method of antenna switching for switching transmitting branches each for transmitting signals via an antenna and at least one frequency band, with at least two receiving branches each receiving signals via at least one frequency band and said antenna, which method comprises the steps of:

switching a first transmitting branch via at least one first semiconductor switch to be coupled in series between said first transmitting branch and said antenna, switching a second transmitting branch via at least one second semiconductor switch to be coupled in series between said second transmitting branch and said antenna, and switching at least one third semiconductor switch to be coupled in parallel to at least one receiving branch;

wherein said antenna switching is transmission-line-less.

* * * * *